United States Patent [19]

Suzuki et al.

[11] 4,341,317
[45] Jul. 27, 1982

[54] BIAXIALLY ORIENTED BOTTLE OF SATURATED POLYESTER RESIN

[75] Inventors: Sadao Suzuki; Harumi Kinoshita; Takuzo Takada; Fumio Negishi, all of Tokyo, Japan

[73] Assignee: Yoshino Kogyosho Co., Ltd., Japan

[21] Appl. No.: 148,388

[22] Filed: May 9, 1980

[51] Int. Cl.³ .............................................. B65D 25/42
[52] U.S. Cl. ...................................................... 215/31
[58] Field of Search .................. 215/31; 264/516, 513; 222/107, 566

[56] References Cited

U.S. PATENT DOCUMENTS

| | | | |
|---|---|---|---|
| 2,177,754 | 10/1939 | Tainsh | 222/566 |
| 2,184,712 | 12/1939 | Fleissig | 222/107 |
| 3,026,576 | 3/1962 | Henderson | 264/513 |
| 3,518,803 | 7/1970 | Wunderlich et al. | 31 X/ |
| 3,719,735 | 3/1973 | Valyi | 264/516 |
| 3,744,656 | 7/1973 | Schiemann | 215/31 |
| 4,185,757 | 1/1980 | Schultz | 222/107 |

FOREIGN PATENT DOCUMENTS 749640 11/1944 Fed. Rep. of Germany ........ 215/31
593202  5/1925 France ................................ 215/31

Primary Examiner—Donald F. Norton
Attorney, Agent, or Firm—Stevens, Davis, Miller & Mosher

[57] ABSTRACT

A biaxially oriented bottle of saturated polyester resin has a disadvantage that the mouth or the part extending from the neck to the shoulder, which is not oriented or is oriented only a little, is much poorer in durability and resistance to the content liquid than the body which is molded under sufficient orientation. Such a disadvantage has been surmounted in this invention by covering the inside of the mouth or the part extending from the neck to the shoulder, which is in direct contact with the content liquid, with a layer which is durable and resistant to the content liquid.

2 Claims, 11 Drawing Figures

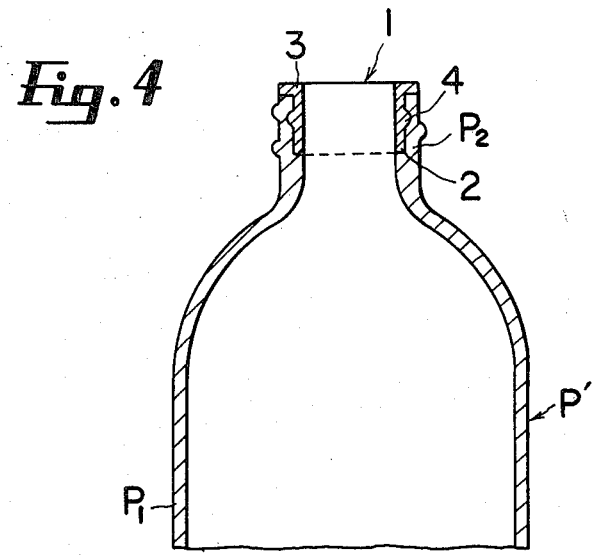
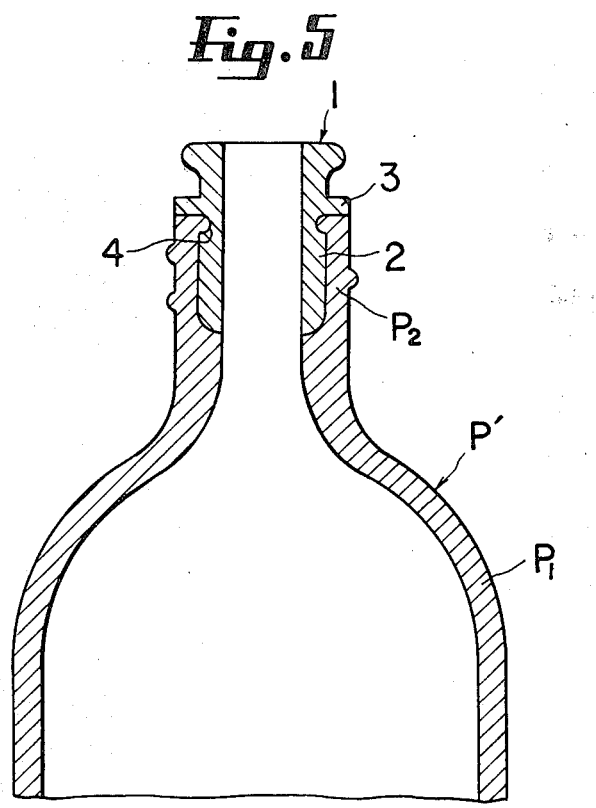

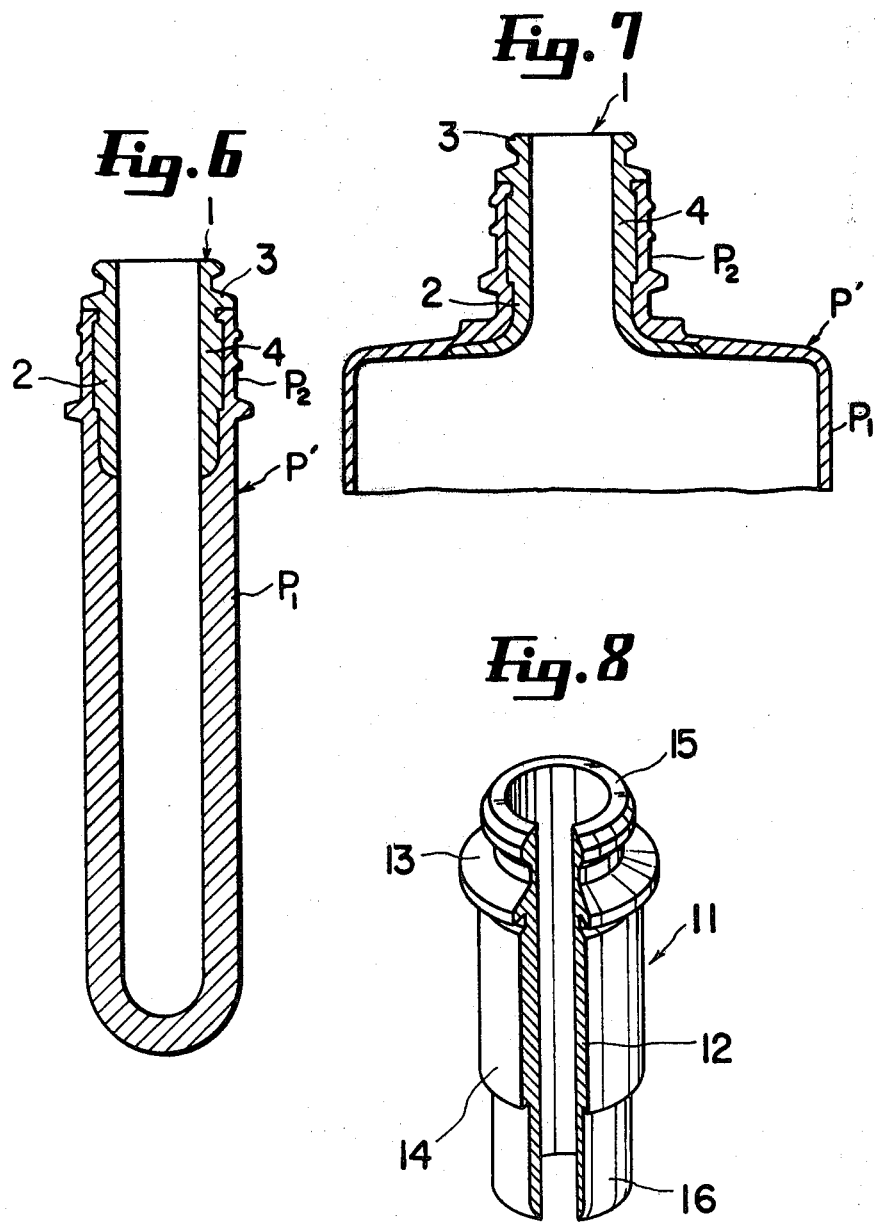

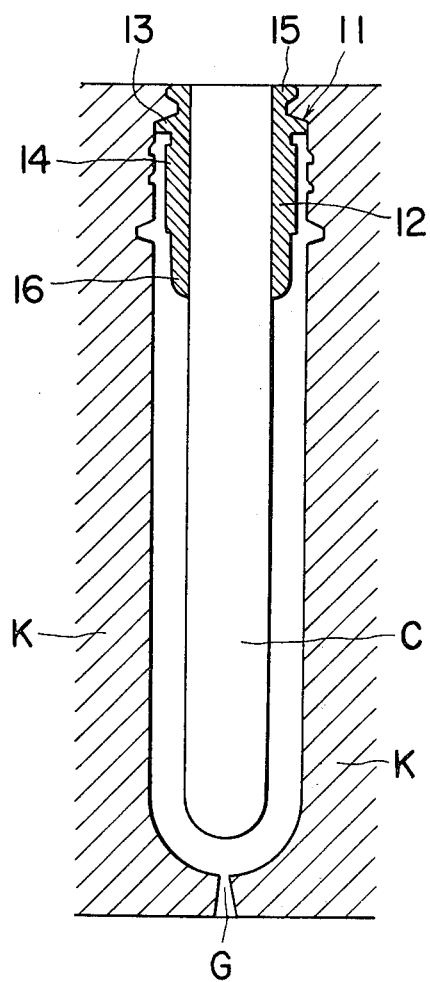
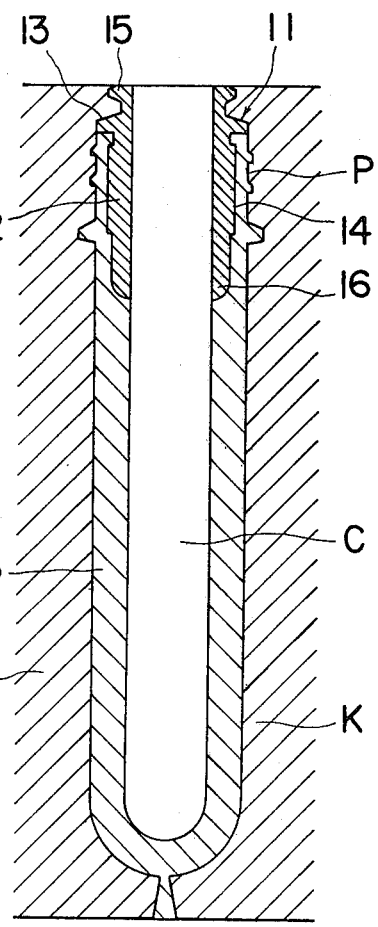

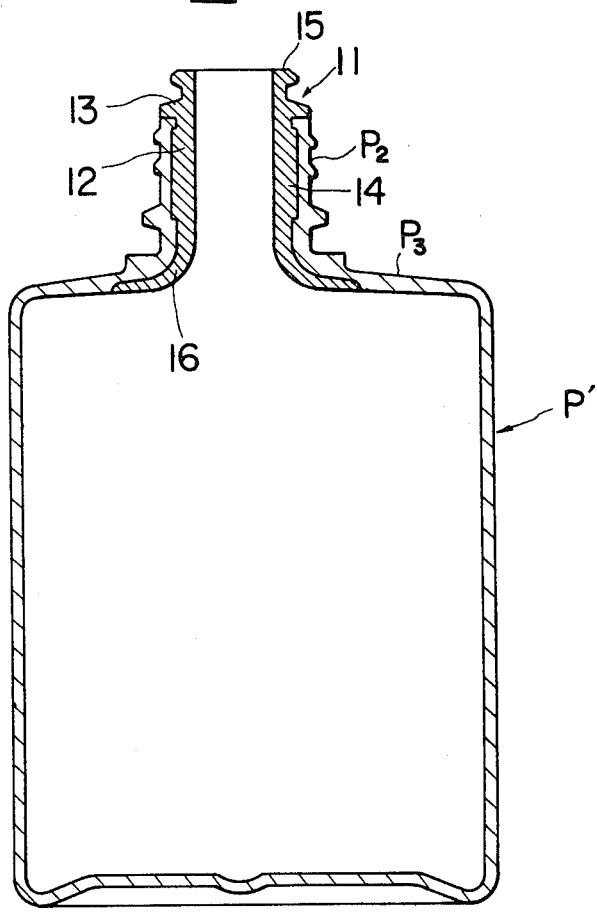

BIAXIALLY ORIENTED BOTTLE OF SATURATED POLYESTER RESIN

This invention relates to a biaxially oriented bottle of saturated polyester resin and a method for molding the same.

Biaxially oriented bottles of synthetic resin, particularly saturated polyester resin such as polyethylene terephthalate, are in general use in large quantities because of the outstanding physical properties and durability resulting from the crystallization of molecules which occurs when the bottle is subjected to biaxial orientation in the molding process.

In spite of the superior characteristics, the biaxially oriented bottles of saturated polyester resin are not necessarily completely satisfactory when used as containers for alcoholic liquids.

The great disadvantage of biaxially oriented bottles of saturated polyester resin is that the mouth or the part extending from the neck to the shoulder, which is not oriented or is oriented only a little, is much poorer in durability and physical properties than the body which is molded under sufficient orientation. This disadvantage results from the fact that the bottles are molded, with few exceptions, by so-called injection blow molding process in which bottomed cylindrical parisons are formed by injection molding and subsequently the parisons are molded into bottles by biaxial orientation blow molding.

The disadvantage resulting from the fact that the mouth or the part extending from the neck to the shoulder is not oriented manifests itself as whitening or crazing caused by infiltration of alcohol when the bottle is filled with a liquid containing alcohol at a concentration more than 20%. In addition, the unoriented mouth is too soft and weak to be sealed by snap-in fitting, and is liable to deformation due to the tightening force of screw cap.

Heretofore, a variety of means have been employed in order to improve the durability and physical properties of the mouth or the part extending from the neck to the shoulder.

One means includes orientation of the mouth and neck in a radial direction after biaxial orientation molding of the body. This produces satisfactory results to some extent, but involves technical difficulties in radial orientation with respect to the orientation equipment and dimensional accuracy of the neck.

Another means is directed to whitening the neck by crystallization under proper temperature control. This has a disadvantage of being unable to be employed for applications where the neck has to be clear as well as the body, although the neck is made chemically stable and mechanically strong by crystallization to a certain degree. The improvement of mechanical strength by crystallization is limited for saturated polyester resin which has an inherently low viscosity.

According to this invention, the improvement in durability and physical properties can be accomplished without difficulties encountered in the above-mentioned conventional methods.

Therefore, it is an object of this invention to provide a method for improving the chemical and mechanical properties of the mouth, neck, and shoulder of a biaxially oriented bottle of saturated polyester resin which undergoes no or little orientation.

It is another object of this invention to provide a method for integrally bonding a mouthpiece, which forms the mouth of the bottle, to the body of the bottle.

The gist of the invention consists in covering the mouth or the part extending from the neck to the shoulder, which is in direct contact with the content liquid, with a layer which is resistant to alcohol and other chemicals even without biaxial orientation, in order to solve the problems inherent in the properties of saturated polyester resin itself.

Other objects and advantages of the present invention will become apparent from the following description taken in conjunction with the accompanying drawings, wherein:

FIG. 4 is a longitudinal sectional view of the bottle, with the mouthpiece as shown in FIG. 1 fitted to the mouth;

FIG. 5 is a longitudinal sectional view of the bottle, with the mouthpiece of different type fitted to the mouth;

FIG. 6 is a longitudinal sectional view of the mouthpiece fitted onto the parison prior to biaxial orientation;

FIG. 7 is a longitudinal sectional view of the mouthpiece and the shoulder of the bottle after biaxial orientation of the parison as shown in FIG. 6;

FIG. 8 is a partially sectional perspective view of another example of the mouthpiece;

FIGS. 9 to 11 are sectional views illustrating an example in which the mouthpiece as shown in FIG. 8 is used;

FIG. 9 is a longitudinal sectional view of an injection molded mouthpiece fitted onto the core;

FIG. 10 is a longitudinal sectional view of the parison injection molded in the cavity, with the mouthpiece inserted; and FIG. 11 is a longitudinal sectional view illustrating the structure of the bottle produced by the method of this invention.

Figure 1:
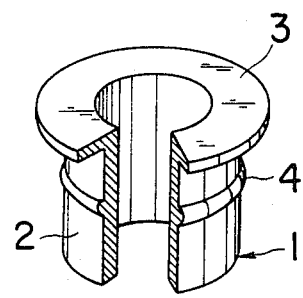
FIG. 1 is a partially sectional perspective view of an example of the mouthpiece used in the invention.
Figure 2:
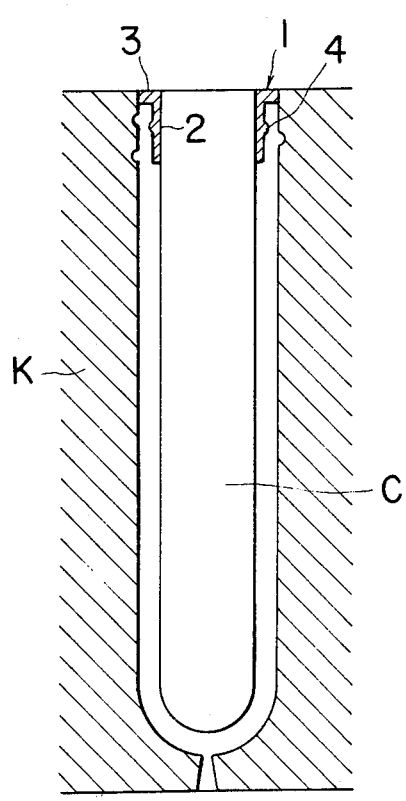
FIG. 2 is a longitudinal sectional view of the mouthpiece fitted onto the core, with the molds closed.
Figure 3:
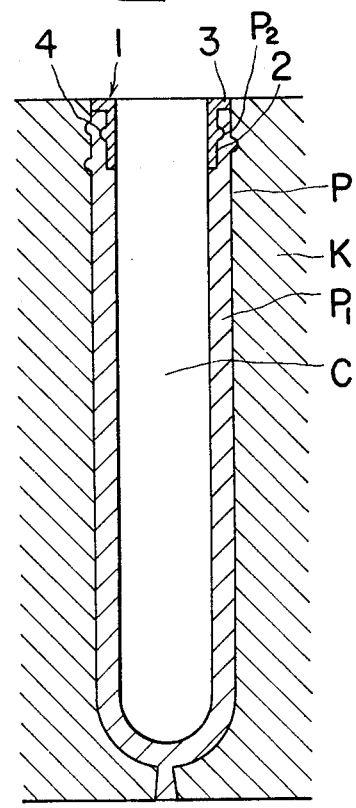
FIG. 3 is a longitudinal sectional view of the parison injection molded in the cavity.

The present invention will be described by referring to the drawings.

The bottle according to this invention is made up of a bottle body P' and a mouthpiece 1 molded separately from the body P'. The cylindrical mouthpiece 1 is snugly fitted to the inside of a neck $P_2$ of the body P', and serves as a mouth of the bottle. As shown in FIGS. 4 and 5, the mouthpiece 1 fitted to the inside of the neck $P_2$ of the body P' forms a mouth of the biaxially oriented bottle. The mouthpiece 1 forming a mouth of the bottle is of cylindrical shape that snugly fits to the inside of the neck $P_2$ of the body P' or parison P. The mouthpiece 1 should preferably be provided with a flange 3 large enough to cover the upper end of the neck $P_2$ so that the entire part of the mouth which comes in contact with the content liquid in actual use of the bottle is formed by the mouthpiece 1. The flange 3 is formed on the top of the body 2 as shown in FIG. 1.

The mouthpiece 1 is molded separately and independently from the blow molding of the bottle body P'. The mouthpiece 1 may be produced from several materials, but should preferably be produced from polyethylene terephthalate resin by biaxial orientation molding, in view of the strength of fitting to the bottle body P'.

Other resins that may be used included polyester resin having an intrinsic viscosity greater than 1.0, polybutylene terephthalate resin, polyvinyl chloride resin, and acrylonitrile-butadiene-styrene resin. The mouthpiece may also be molded from metallic material, e.g., aluminum.

The process for molding the bottle of this invention is described below. The mouthpiece 1 is molded in such dimensions that it is snugly fitted onto the base of the core C on which is molded the parison P which is subsequently orientation blow molded into the body P'. The mouthpiece 1 thus prepared is slipped onto the base of the core C and then the molds K are closed, as shown in FIG. 1. The parison P is formed by injecting molten polyethylene terephthalate into the cavity surrounded by the core C, the molds K, and the mouthpiece 1. In other words, the parison P is produced by insert molding, using the mouthpiece 1 as a part of the mold. Therefore, the mouthpiece 1 and the parison P are combined closely together. The injection molded parison P combined with the mouthpiece 1 is subsequently placed in the blow mold for orientation blow molding.

The firm bonding of the parison P and the mouthpiece 1 is accomplished by insert molding as mentioned above, but the bond strength may be further increased if the body 2 of the mouthpiece 1 is provided with a locking part 4, projection or recession, on the periphery. The locking part 4 is not necessarily continuous along the periphery of the body 2, but may be broken.

The locking part 4 is not so important where the mouthpiece 1 is made of biaxially oriented polyethylene terephthalate, which becomes bonded firmly to the parison P when the parison P is molded. But the locking part 4 plays an important role in firm bonding where the mouthpiece 1 made of aluminum is used, which is poor in adhesion to the parison P.

If the mouthpiece 1 is extended beyond the flange 3 as shown in FIG. 5, the extended part prevents the content liquid from coming into contact with the neck $P_2$ of the body P' during pouring, and consequently protects the neck $P_2$ from deterioration. In addition, the extended part in combination with a cap or packing helps maintain sealing for a long period of time.

Where the mouthpiece 1 made of synthetic resin is employed, the mouthpiece 1 should preferably be longer than the neck of the body P', as shown in FIG. 6, so that the lower part of the mouthpiece 1 covers the inside of the shoulder near the neck which is less oriented, as shown in FIG. 7, when the parison P is molded into the body P' by biaxial orientation.

The extended lower part of the mouthpiece 1 is able to cover the inside of the neck and shoulder which do not undergo sufficient orientation, even though the mouthpiece 1 is made of a synthetic resin of high viscosity, because such a part is subjected to only a little orientation.

FIG. 8 shows another example of mouthpiece 1 which covers the inside of the shoulder. In FIG. 8, the mouthpiece 11 is made up of a cylindrical body 12 having a smooth inside, an opening 15 at the top of the body 12, a flange 13 just below the opening 15, and a locking part 14 just below the flange 13. The locking part 14 serves to ensure bonding between the mouthpiece 11 and the parison P when the parison P is formed by insert molding, with the mouthpiece 11 fitted to the core. It may be in the form of projection or recession. It is not necessarily continuous as illustrated, but may be broken.

The locking part 14 is provided at a place corresponding to the neck $P_2$ of the parison P, and the lower part 16 of the body 12 is extended to cover that part of the parison P which forms the shoulder $P_3$ when the parison P is molded into the bottle body P' by biaxial orientation. In other words, the mouthpiece 11 is long enough to cover the area from the opening 15 at the top of the bottle body P' to the shoulder $P_3$ near the neck $P_2$ which does not undergo sufficient orientation.

The flange 13 is provided in such a manner that it covers completely the top surface of the parison P, in order to prevent the content liquid, when poured out, from coming into contact with the outside of the neck $P_2$ as far as possible; but it may be omitted. It should preferably be provided to ensure stable engagement between the mouthpiece 11 and the parison P and to reinforce the mechanical strength of the opening 15.

The mouthpiece 11 may be injection molded from saturated polyester resin or polybutylene terephthalate resin having intrinsic viscosity greater than 1.0, polyvinyl chloride resin, acrylonitrile-butadiene-styrene resin, etc., which are inherently superior in mechanical strength and chemical properties such as resistance to alcohol and chemicals, even without orientation.

The mouthpiece 11 is slipped onto the base of the core C, as shown in FIG. 9, and the molds K are closed, with the core C placed therebetween. Saturated polyester resin of low viscosity is injected from the gate G into the cavity surrounded by the molds K, the core C, and the mouthpiece 11, to form the parison P, as shown in FIG. 10. Upon completion of injection molding, the mouthpiece 11 is integrally bonded to the parison P.

The parison P thus prepared is then removed from the mold and transferred to the biaxial orientation blow mold to blow the parison P into the bottle body P' as shown in FIG. 11. In the blow molding process, the lower part 16 of the mouthpiece 11, which extends to the shoulder $P_3$ near the neck $P_2$ of the body P' as mentioned above, undergoes orientation together with the parison P.

The mouthpiece 11 made of high viscosity resin is poorer in moldability than the parison P made of low viscosity polyester resin, but the lower part 16 of the mouthpiece 11 can conform to the configuration of the shoulder $P_3$ near the neck $P_2$, because only a little orientation is made at the shoulder $P_3$ near the neck $P_2$.

The parison P made of low viscosity saturated polyester resin can be formed into the bottle body P' having a relatively sharp corner, as shown in FIG. 11, because of its good moldability.

The bottle according to this invention is suitable for use as cosmetic containers which in many cases have a square shape with sharp corners. In addition, the bottle according to this invention is suitable for use as containers for liquid cosmetics containing alcohol at relatively high concentrations and perfumes.

The advantages of this invention may be summarized as follows: It is possible to increase the chemical durability and mechanical strength of the mouth and the part extending from the neck to the shoulder of the bottle which undergo no or little orientation. It is possible to make the bottle having relatively sharp corners because the body is made of low viscosity polyester resin having good moldability. The mouthpiece is integrally bonded to the body of the bottle as the result of insert molding in which the mouthpiece serves as a part of the mold. The mouthpiece and the parison can be handled as a single object in the conventional manner without any modification.

What is claimed is:

1. A biaxially oriented, blow molded bottle of saturated polyester resin, which comprises:
    a body having a threaded neck and a shoulder portion, said neck having an upper end;
    a mouthpiece snugly fitted to the inside of the neck, said mouthpiece having an upper flange which overlies the upper end of the neck, said mouthpiece being from an injection molded synthetic resin and having a length sufficient to extend from the neck to the shoulder portion of the bottle, said mouthpiece having an oriented lower portion and an intermediate portion, said lower portion being reduced in thickness relative to said intermediate portion.

2. A biaxially oriented blow molded bottle as claimed in claim 1, wherein said mouthpiece further comprises a mouth opening connected to and formed above said flange.

* * * * *